(12) United States Patent
Mere et al.

(10) Patent No.: US 11,869,374 B2
(45) Date of Patent: Jan. 9, 2024

(54) METHOD AND SYSTEM FOR ASSISTING IN THE MANAGEMENT OF THE ENERGY OF AN AIRCRAFT OVER A MINIMUM GROUND DISTANCE IN AN APPROACH PHASE

(71) Applicant: Airbus Operations SAS, Toulouse (FR)

(72) Inventors: Jean-Claude Mere, Toulouse (FR); Ramon Andreu Altava, Toulouse (FR)

(73) Assignee: Airbus Operations SAS, Toulouse (FR)

(*) Notice: Subject to any disclaimer, the term of this patent is extended or adjusted under 35 U.S.C. 154(b) by 117 days.

(21) Appl. No.: 17/146,601

(22) Filed: Jan. 12, 2021

(65) Prior Publication Data

US 2021/0217322 A1    Jul. 15, 2021

(30) Foreign Application Priority Data

Jan. 14, 2020  (FR) ..................................... 2000274

(51) Int. Cl.
  *G08G 5/02*  (2006.01)
  *G05D 1/06*  (2006.01)
  *G08G 5/00*  (2006.01)

(52) U.S. Cl.
  CPC ............ *G08G 5/025* (2013.01); *G05D 1/0676* (2013.01); *G08G 5/003* (2013.01); *G08G 5/0013* (2013.01)

(58) Field of Classification Search
  CPC ...... G08G 5/025; G08G 5/0013; G08G 5/003; G05D 1/0676
  See application file for complete search history.

(56) References Cited

U.S. PATENT DOCUMENTS

| | | | |
|---|---|---|---|
| 8,781,654 B2 | 7/2014 | Giovannini et al. | |
| 9,193,442 B1 | 11/2015 | Young et al. | |
| 11,113,978 B2* | 9/2021 | De Villele | G01C 23/00 |

(Continued)

FOREIGN PATENT DOCUMENTS

| | | | |
|---|---|---|---|
| FR | 2968818 A1 | 6/2012 |
| FR | 3043473 A1 | 5/2017 |
| FR | 3068125 A1 | 12/2018 |

OTHER PUBLICATIONS

Three-dimensional_3D_Monte-Carlo_modeling_for_UAS_collision_risk (Year: 2020).*
French Search Report; priority document.

*Primary Examiner* — Jeff A Burke
*Assistant Examiner* — Kyle T Johnson
(74) *Attorney, Agent, or Firm* — Greer, Burns & Crain, Ltd.

(57) ABSTRACT

A system includes a reception unit to receive current flight data of the aircraft and current meteorological data, a data processing unit to perform an iterative computation to determine, as a function at least of a set of predetermined rules, of a set of constraints and of current values including current meteorological data, an optimal flight trajectory making it possible to generate a dissipation of the energy of the aircraft to bring it, at a stabilized final position, into a final energy state with a minimum ground distance, the optimal flight trajectory defining positions at which actions must be implemented on the aircraft, and a data transmission unit to transmit at least the minimum distance to at least one user system.

9 Claims, 4 Drawing Sheets

(56) References Cited

U.S. PATENT DOCUMENTS

| | | |
|---|---|---|
| 2014/0358415 A1 | 12/2014 | McDonald et al. |
| 2016/0116917 A1* | 4/2016 | Bataillon ............. G05D 1/0676 |
| | | 701/16 |
| 2017/0132941 A1 | 5/2017 | Giovannini |
| 2018/0370645 A1 | 12/2018 | Durand et al. |
| 2019/0304315 A1* | 10/2019 | Hodges ................ G05D 1/0676 |
| 2020/0013295 A1* | 1/2020 | Moravek .............. G05D 1/0676 |
| 2020/0023994 A1* | 1/2020 | Lax ...................... G08G 5/0039 |
| 2021/0217322 A1* | 7/2021 | Mere .................... G05D 1/0676 |

\* cited by examiner

METHOD AND SYSTEM FOR ASSISTING IN THE MANAGEMENT OF THE ENERGY OF AN AIRCRAFT OVER A MINIMUM GROUND DISTANCE IN AN APPROACH PHASE

CROSS-REFERENCES TO RELATED APPLICATIONS

This application claims the benefit of the French patent application No. 2000274 filed on Jan. 14, 2020, the entire disclosures of which are incorporated herein by way of reference.

FIELD OF THE INVENTION

The present invention relates to a method and a system for assisting in the management of the energy of an aircraft, in particular of a transport airplane for performing management of the energy of the aircraft over a minimum ground distance, in an approach phase with a view to a landing on a landing runway of an airport.

BACKGROUND OF THE INVENTION

To land an aircraft, in particular a transport airplane, on a landing runway, this aircraft flying at a current instant with a current energy, it is necessary to manage the dissipation of its energy in the approach to the landing runway so that, on the one hand, the contact between the aircraft and the ground is not too abrupt, and, on the other hand, once the aircraft is on the ground, it has a sufficient braking capacity to stop before an end of the landing runway. For that, the landing procedures provide for the aircraft to have to be in a so-called stabilized state when it reaches, in descent, a stabilization point situated at a predetermined height with respect to the ground. The predetermined height can, for example, be 1000 feet (approximately 300 meters) or 500 feet (approximately 150 meters). The stabilized state corresponds to stabilized approach conditions, which notably comprise an approach speed (calculated generally by an onboard flight management system) and an approach slope that are predetermined and stabilized (that is to say, constant over time) defined in the landing procedure considered. These stabilized approach conditions must be maintained throughout the approach to the landing runway, to a height, for example, of 50 feet (approximately 15 meters) in direct proximity to the landing runway.

The approach phase is, therefore, one of the most stressful flight phases in terms of work for the crew of the aircraft. In fact, the crew must stabilize the aircraft during the final approach to ensure that it can land in total safety. Various factors such as a late clearance from air traffic control or strong tail winds, can bring the aircraft into a high energy condition. In such circumstances, the crew controls the aircraft, through primary and secondary control elements, for example air brakes, the landing gear and/or modifications of flight configuration, in order to reduce the excess energy. These actions are performed by the pilot on the basis of his or her experience and skills.

In some total energy conditions of the aircraft, it may be impossible to stabilize the aircraft. Thus, it may be that an ineffective energy management results in a go-around of the aircraft.

To assist the pilots in managing the energy of the aircraft, it is known practice to determine a limit flight trajectory. In particular, from the documents U.S. Pat. No. 8,781,654 and FR-2 968 818, it is known practice to determine and present to the pilots a limit trajectory representing a flight trajectory of the aircraft which is compatible with the performance levels of the aircraft in the approach and which illustrates limits within which the aircraft can move in the approach.

Such a flight trajectory is constructed by taking into account fixed hypotheses and fixed parameter values. Now, different parameters can vary, notably as a function of the meteorological conditions, and, in particular, the wind. Consequently, the flight trajectory that is thus constructed is not necessarily the limit trajectory.

Now, it may be useful for the pilots to have a limit trajectory, that is the shortest possible, that allows a stabilized approach to be achieved.

SUMMARY OF THE INVENTION

An object of the present invention is to determine and provide an optimal flight trajectory which makes it possible to stabilize the aircraft with a minimum ground distance. For this, it relates to a method for assisting in the management of the energy of an aircraft, in an approach phase with a view to a landing, the approach making it possible to join a so-called final position at which the aircraft needs to have a final energy state from a current energy state of the aircraft.

According to the invention, the method comprises:
at least one reception step, implemented by a reception unit, comprising receiving current flight data of the aircraft making it possible at least to determine the current energy state, and current meteorological data of the environment of the aircraft;
a set of computation steps, implemented by a data processing unit, comprising performing an iterative computation, backwards from the final position, to determine, as a function of a set of predetermined rules, of a set of constraints and of current values including the current meteorological data, an optimal flight trajectory making it possible to generate a dissipation of the energy of the aircraft to bring it, at the final position, into the final energy state with a minimum ground distance, the optimal flight trajectory defining positions at which actions must be implemented on the aircraft; and
a data transmission step, implemented by a data transmission unit, comprising transmitting at least the minimum distance to at least one user system.

Thus, by virtue of the invention, the method generates an optimal flight trajectory which makes it possible to stabilize the aircraft with a minimum ground distance, and to do so by taking into account current meteorological conditions (or data), and notably the wind, which can have an influence on the performance levels of the aircraft.

An effective energy limit trajectory is therefore available. In particular, if it is presented to the pilots, it makes it possible to increase, in real time, the awareness of the pilots to the energy situation. Such information allows the pilots to reduce the number of non-stabilized approaches and, therefore, the number of go-arounds. Consequently, by virtue of the invention, the number of incidents or accidents resulting from a landing with excessively high energy can be reduced.

Advantageously, the set of computation steps comprises at least the following series of steps, implemented iteratively:
a first step comprising determining, on each iteration, as a function at least of the set of predetermined rules, a plurality of states from a state selected on the preceding iteration, the selected state used in the first iteration corresponding to the state of the aircraft at the final position, the selected states being saved;

a second step comprising attributing a cost to each of the states determined in the first computation step; and a third step comprising selecting, from the states determined in the first computation step, the state which exhibits the lowest cost, the state thus selected being used in the first computation step of the next iteration, the state selected in the last iteration being used to determine the optimal flight trajectory of the aircraft.

Furthermore, advantageously, a state is defined by characteristics of the aircraft, including at least its height with respect to the ground and its speed, and possibly its distance to the destination, its weight and the weather.

Moreover, advantageously, the meteorological data comprises at least one of the following data:
the wind;
the temperature.

Furthermore, advantageously, the data transmission step comprises transmitting, to the user system, also the optimal flight trajectory, on which are indicated positions at which actions must be implemented on the aircraft, and the actions to be implemented at these positions.

Moreover, advantageously, the method comprises a display step comprising displaying, on a display screen of the cockpit of the aircraft, at least one limit point corresponding to the point upstream on the optimal flight trajectory where the minimum ground distance begins.

The present invention also relates to a system for assisting in the management of the energy of an aircraft, in an approach phase with a view to a landing, the approach making it possible to join a so-called final position at which the aircraft needs to have a final energy state from a current energy state of the aircraft.

According to the invention, the system comprises:

a reception unit configured to receive current flight data of the aircraft making it possible at least to determine the current energy state, and current meteorological data of the environment of the aircraft;

a data processing unit configured to perform an iterative computation, backwards from the final position, in order to determine, as a function at least of a set of predetermined rules, of a set of constraints and of current values including the current meteorological data, an optimal flight trajectory making it possible to generate a dissipation of the energy of the aircraft to bring it, at the final position, into the final energy state with a minimum ground distance, the optimal flight trajectory defining positions at which actions must be implemented on the aircraft; and a data transmission unit configured to transmit at least the minimum distance to at least one user system.

In a particular embodiment, the data processing unit comprises:

a first element configured to determine, on each iteration, as a function at least of the set of predetermined rules, a plurality of states from a state selected on the preceding iteration, the selected state used in the first iteration corresponding to the state of the aircraft at the final position, the selected states being saved;

a second element configured to attribute a cost, to each of the states determined by the first element; and a third element configured to selected, from among the states determined by the first element, the state which exhibits the lowest cost, the state thus selected being used by the first element on the next iteration, the state selected on the last iteration being used to determine the optimal flight trajectory of the aircraft.

Furthermore, advantageously, the system also comprises a display unit configured to display, on a display screen of the cockpit of the aircraft, at least one limit point corresponding to the point upstream on the optimal flight trajectory where the minimum ground distance begins.

The present invention also relates to an aircraft, in particular a transport airplane, which is equipped with a system for assisting in the management of the energy, such as that mentioned above.

BRIEF DESCRIPTION OF THE DRAWINGS

The attached figures will give a good understanding of how the invention can be produced. In these figures, the references that are identical designate similar elements.

DETAILED DESCRIPTION OF THE PREFERRED EMBODIMENTS

Figure 1:
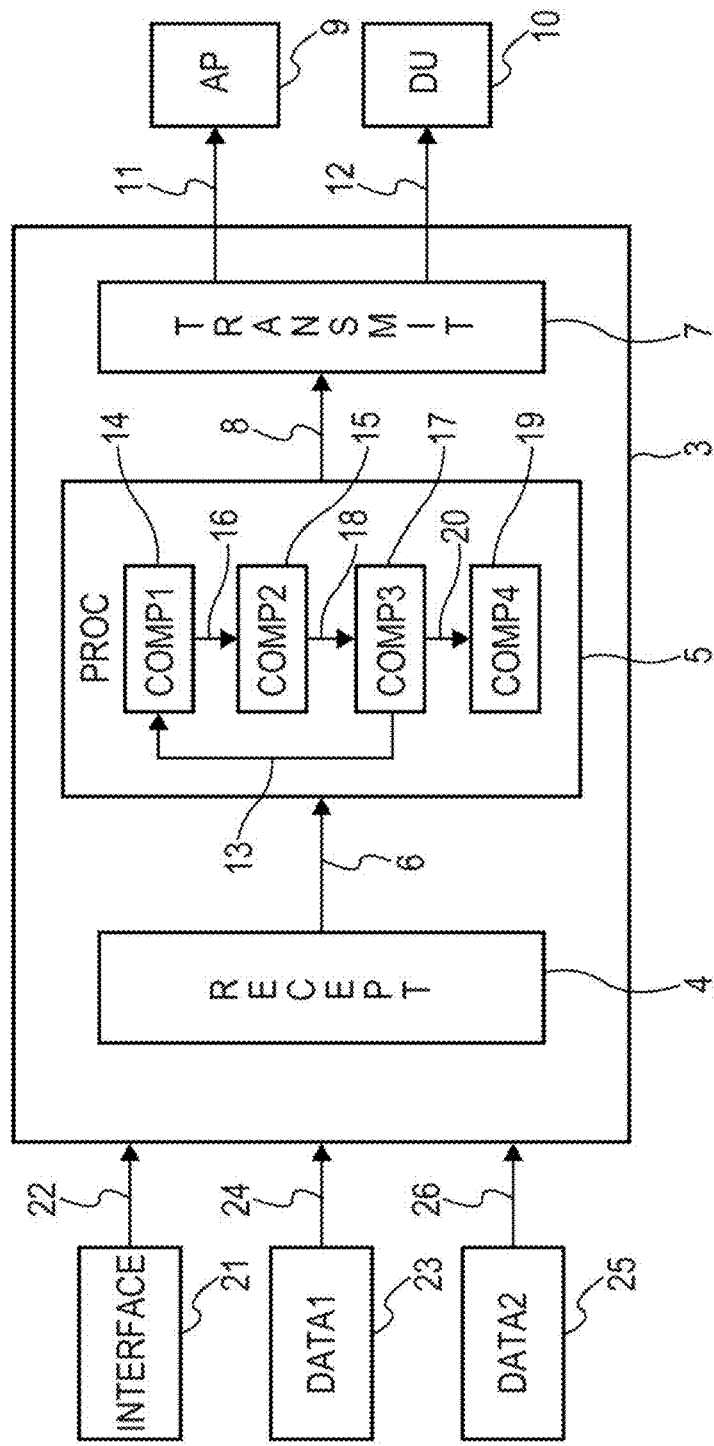
FIG. 1 is the block diagram of a particular embodiment of a system for assisting in the management of the energy.

The system 1 schematically represented in FIG. 1 and used to illustrate the invention is intended to assist the pilot of an aircraft AC (FIGS. 2 and 3), in particular of a transport airplane, in an approach to a landing runway 2 (FIGS. 2 and 3) of an airport, with a view to a landing on this landing runway 2.

This system 1 is intended to assist in the management of the energy, and, more particularly, in the dissipation of the energy, to allow the aircraft AC to join a final position Pf, at which it needs to have a final energy state Ef. This final position Pf corresponds, preferably, to a stabilization point or to a point situated at a given height above the threshold of the landing runway 2 on which the landing of the aircraft AC is planned.

To perform the processing operations, the system 1 takes into account an initial energy state Ei. This initial energy state Ei is equal to the current energy state Ec of the aircraft, that is to say, it is defined with a so-called initial altitude and a so-called initial speed which are equal to the current altitude and to the current speed of the aircraft AC (at its current position Pc).

In the context of the present invention, the concept of energy state is defined, in the usual manner, as the total mechanical energy of the aircraft AC, determined by the sum of a potential energy (directly proportional to the height difference between the considered position of the aircraft AC and the landing runway 2) and a kinetic energy proportional to the square of the considered speed of the aircraft.

According to the invention, the system 1 which is embedded on the aircraft AC (FIG. 2), comprises, as represented in FIG. 1, a central unit 3 comprising:
- a reception unit 4 ("RECEPT") configured to receive data specified hereinbelow;
- a data processing unit 5 ("PROM") linked via a link 6 to the reception unit 4 and intended to process data to generate an optimal flight trajectory TO (FIGS. 2 and 3) making it possible to generate a dissipation of the energy of the aircraft AC from the initial energy state Ei in order to bring it, at the final position Pf, into the final energy state Ef, and to do so with a minimum ground distance Dmin1, Dmin2, as specified hereinbelow; and
- an information transmission unit 7 ("TRANSMIT") which is linked via a link 8 to the data processing unit 5 and which is configured to transmit at least the minimum (horizontal) ground distance Dmin1, Dmin2 to at least one user system 9, 10, respectively via a link 11, 12.

Preferably, the information transmission unit 7 also transmits to the user system 9, 10:
- the optimal flight trajectory TO, on which are indicated positions (specified hereinbelow) at which actions must be implemented on the aircraft; and
- the actions to be implemented at these positions.

Figure 2:
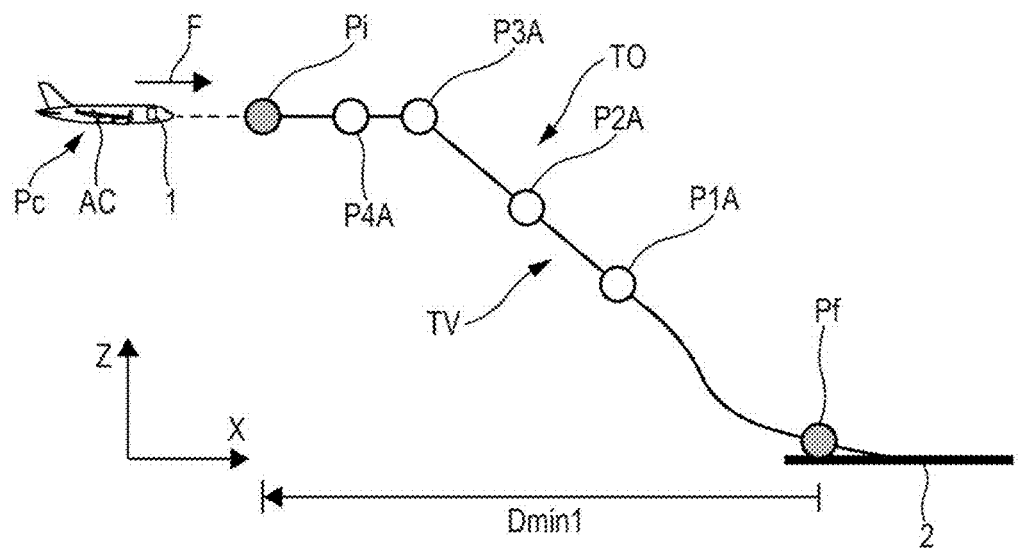
FIG. 2 schematically illustrates the vertical trajectory of an optimal flight trajectory, in the absence of wind.
Figure 3:
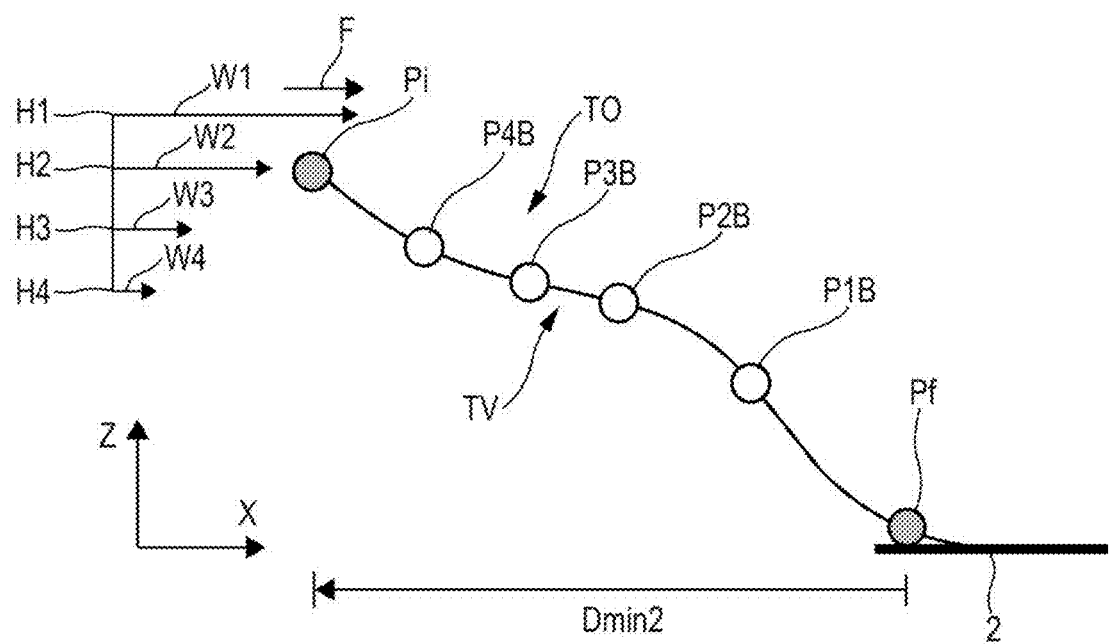
FIG. 3 illustrates a situation similar to that of FIG. 2, with a variable wind depending on the height.

The data processing unit 5 is configured to perform an iterative computation (or processing operation) (that is to say, to perform a given number of iterations). The computation or processing operation is performed backwards (that is to say, upstream in the reverse direction to the direction of flight F) from the final position Pf. The data processing unit 5 is configured to determine, as a function at least of a set of predetermined rules, of a set of constraints and of current values including current meteorological data (which can have an influence on the performance levels of the aircraft AC), an optimal flight trajectory TO (FIGS. 2 and 3) making it possible to generate a dissipation of the energy of the aircraft AC to bring it, at the final position Pf, into the final energy state Ef with a minimum ground distance Dmin1, Dmin2 (FIGS. 2 and 3). This optimal flight trajectory TO defines positions at which actions must be implemented on the aircraft AC, notably to modify the flight configuration of the aircraft AC, contributing to the dissipation of the energy.

To do this, the data processing unit 5 comprises computation elements 14, 15 and 17 which perform an iterative computation. More specifically, it comprises:
- the computation element 14 (COMP1, with "COMP" for "computation unit") which is linked via the link 6 to the reception unit 4 and which is configured to determine, as a function at least of the set of predetermined rules, a plurality of states from a state selected on the preceding iteration. The selected state used in the first iteration corresponds to the state of the aircraft at the final position Pf. The selected states are saved, for example in a memory (not represented) of the data processing unit 5;
- the computation element 15 (COMP2) which is linked via a link 16 to the computation unit 14 and which is configured to attribute a cost to each of the states determined by the computation element 14; and
- the computation element 17 (COMP3) which is linked via a link 18 to the computation element 15 and which is configured to select, from among the states determined by the computation element 14, the state which exhibits the lowest cost (from among the costs attributed by the computation element 15). The state thus selected is used by the computation element 14 from the next iteration, by being received via a link 13.

The state selected on the last iteration, and those selected on the preceding iterations and retained, are used to define the optimal flight trajectory TO which passes through the different selected states. The data processing unit 5 comprises, in addition, a computation unit 19 (COMP4) which is linked via a link 20 to the computation element 17 and which is configured to determine the optimal flight trajectory TO of the aircraft AC, notably from the states selected and retained. The optimal flight trajectory TO is the flight trajectory which makes it possible to produce the energy dissipation as mentioned above.

The optimal flight trajectory TO is defined in space (in 3D) and comprises a lateral flight trajectory TL (hereinafter "lateral trajectory") and a vertical flight trajectory TV (hereinafter "vertical trajectory"). The lateral trajectory TL (FIGS. 5 to 7) corresponds to the part of the optimal flight trajectory TO in horizontal plane, and the vertical trajectory TV (FIGS. 2 and 3) corresponds, for its part, to the part of the optimal flight trajectory TO in the vertical plane.

Furthermore, in a particular embodiment, the system 1 comprises, as represented in FIG. 1, the following user systems:
- an automatic pilot system 9 ("AP") which can receive the optimal flight trajectory TO (via the link 11) and use it, in a particular implementation, to automatically guide the aircraft; and
- a display unit 10 ("DU") for displaying elements of the optimal flight trajectory TO (received via the link 12) on at least one screen of the cockpit of the aircraft, as specified hereinbelow.

Moreover, in a particular embodiment, the system 1 can also comprise:
- an interface 21 ("INTERFACE") allowing a pilot to enter data into the central unit 3, via a link 22. These data can notably be supplied to the pilot by air traffic control. In a variant embodiment, the display unit 10 forms part of this interface 21;
- a set 23 of data sources (DATA1, with "DATA" for "Data Generation Unit") allowing data to be entered into the central unit 3, from outside the aircraft, via a data transmission link 24. These data are notably supplied by air traffic control; and
- a set 25 of data sources (DATA2) which comprise standard systems and/or sensors embedded to determine, in particular to measure or estimate, in the normal manner, current flight conditions of the aircraft. These are supplied to the central unit 3 via a link 26.

More specifically, the set 25 can determine and supply at least the following current flight conditions:
- the height of the aircraft AC with respect to the ground;
- the speed of the aircraft; and
- the aerodynamic configuration (positions of the slats and flaps in particular) of the aircraft AC.

The current meteorological data can be supplied to the central unit 3, by the set 23 and/or by the set 25 depending on the embodiment envisaged.

The meteorological data comprise at least one of the following data:
- the wind; and
- the temperature, for example of ISA type (for "International Standard Atmosphere").

The wind can be received (by embedded means forming part of the set 25), for example from an embedded flight management system which comprises wind forecasts or else embedded sensors. The wind can also be received via the data transmission link 24 (set 23), from outside the aircraft, for example from air traffic control or from another aircraft. The same can apply for the temperature and/or for other current meteorological data used.

The optimal flight trajectory TO (or limit energy trajectory) determined by the system 1 is the last trajectory which allows the crew to perform a stabilized approach. In other words, this optimal flight trajectory TO is the trajectory which stabilizes the aircraft with a minimum ground distance. "Ground distance" of a flight trajectory is understood to mean the distance of the projection on the ground of this flight trajectory. The system 1 therefore determines the minimum ground distance Dmin1, Dmin2 which in real time takes into account the current (or dynamic) meteorological conditions, which minimizes the risk of performing a non-stabilized approach and having to implement a go-around procedure.

In the context of the invention, the terms "upstream" and "downstream" are defined with respect to the direction of flight of the aircraft AC, which is illustrated by the arrow F notably in FIGS. 2 and 3. The initial position Pi is therefore the most downstream position where the aircraft AC can dissipate the energy difference (between the initial energy state Ei (corresponding to the current energy state Ec) and the final energy state Ef) up to the final position Pf.

The determination of the optimal flight trajectory TO can be activated:
  either automatically, when the current energy state Ec of the aircraft changes, notably when it changes altitude or speed;
  or at the request of a pilot or of an embedded system which would need updated information.

The optimal flight trajectory TO comprises a sequence of actions that have to be implemented at particular positions during the flight of the aircraft along this optimal flight trajectory TO. These actions, the aim of which is to act notably on the configuration and on other characteristics of the aircraft, make it possible to manage a total energy dissipation of the aircraft. It can notably involve the control:
  of means which affect the variation of energy of the aircraft, such as the engines and the air brakes of the aircraft; and/or
  of means which modify the aerodynamic configuration of the aircraft, such as slats, flaps and the landing gear of the aircraft.

If the actions required are not implemented, the approach is not stabilized.

The system 1 thus makes it possible to increase, in real time, the awareness of the pilots of the aircraft, with respect to the energy, in order to reduce the number of non-stabilized approaches and, thus, the number of go-arounds. Consequently, by virtue of the system 1, the number of incidents or of accidents resulting from a landing with excessively high energy can be reduced.

FIGS. 2 and 3 illustrate characteristics of an optimal trajectory TO determined by the system 1 and, more particularly, the taking into account of current meteorological data, in this case the wind.

In these FIGS. 2 and 3, the vertical trajectory TV of the optimal flight trajectory TO is represented. The vertical trajectory TV illustrates the variation of the height of the optimal flight trajectory TO with respect to the ground, in this case with respect to the landing runway 2, a height which is defined according to a direction Z (vertical), and as a function of a horizontal distance which is defined according to a direction X (horizontal, aligned with the longitudinal direction of the landing runway 2).

In the example of FIG. 2, it is considered that there is no wind or that the wind is negligible. The vertical trajectory TV comprises a plurality of points P1A, P2A and P3A between the final position Pf and the initial position Pi. The points Pi, P1A, P2A and P3A define positions at which actions must be implemented on the aircraft. The initial position Pi is the position found, with a minimum ground distance Dmin1 with respect to the final position Pf (according to the direction X). At the initial position Pi, the aircraft AC is at the same speed and at the same altitude as at the current position Pc (that is to say, at the position at the current instant).

In the example of FIG. 3, there is a tail wind, that is to say, in the direction of flight F of the aircraft AC. This wind is variable. More specifically, it decreases with altitude. The wind is represented by arrows W1 to W4, the length of which is proportional to the intensity of the wind. More particularly, a wind:
  of intensity W1 is situated at a height H1 (with respect to the ground, in the direction Z);
  of intensity W2 is situated at a height H2;
  of intensity W3 is situated at a height H3; and
  of intensity W4 is situated at a height H4.

In this example, the intensities of the wind are decreasing (from W1 to W4) when the height decreases (from H1 to H4).

The vertical trajectory TV comprises a plurality of points P1B, P2B, P3B and P4B between the final position Pf and the initial position Pi. The points Pi, P1B, P2B, P3B and P4B define positions at which actions must be implemented on the aircraft. The initial position Pi is the position found, with a minimum ground distance Dmin2 with respect to the final position Pf (according to the direction X). At the initial position Pi, the aircraft AC is at the same speed and at the same altitude as at the current position Pc (that is to say, at the position at the current instant).

In this case, to avoid having to decelerate because of a strong tail wind, there is, first of all, a descent from the position Pi to the position P3B, followed by a deceleration, for example, with a greater deceleration between the points P3B and P2B.

The system 1 therefore supplies the minimum ground distance Dmin1, Dmin2 by taking into account, in real time, the current (dynamic) meteorological conditions, and notably the wind.

The system 1, as described above, can implement a method PR for assisting in the management of the energy of an aircraft, in an approach phase with a view to a landing, which makes it possible to join a final position Pf at which the aircraft AC needs to exhibit a final energy state Ef from an initial current energy state Ei equal to the energy state Ec of the aircraft AC.

Figure 4:
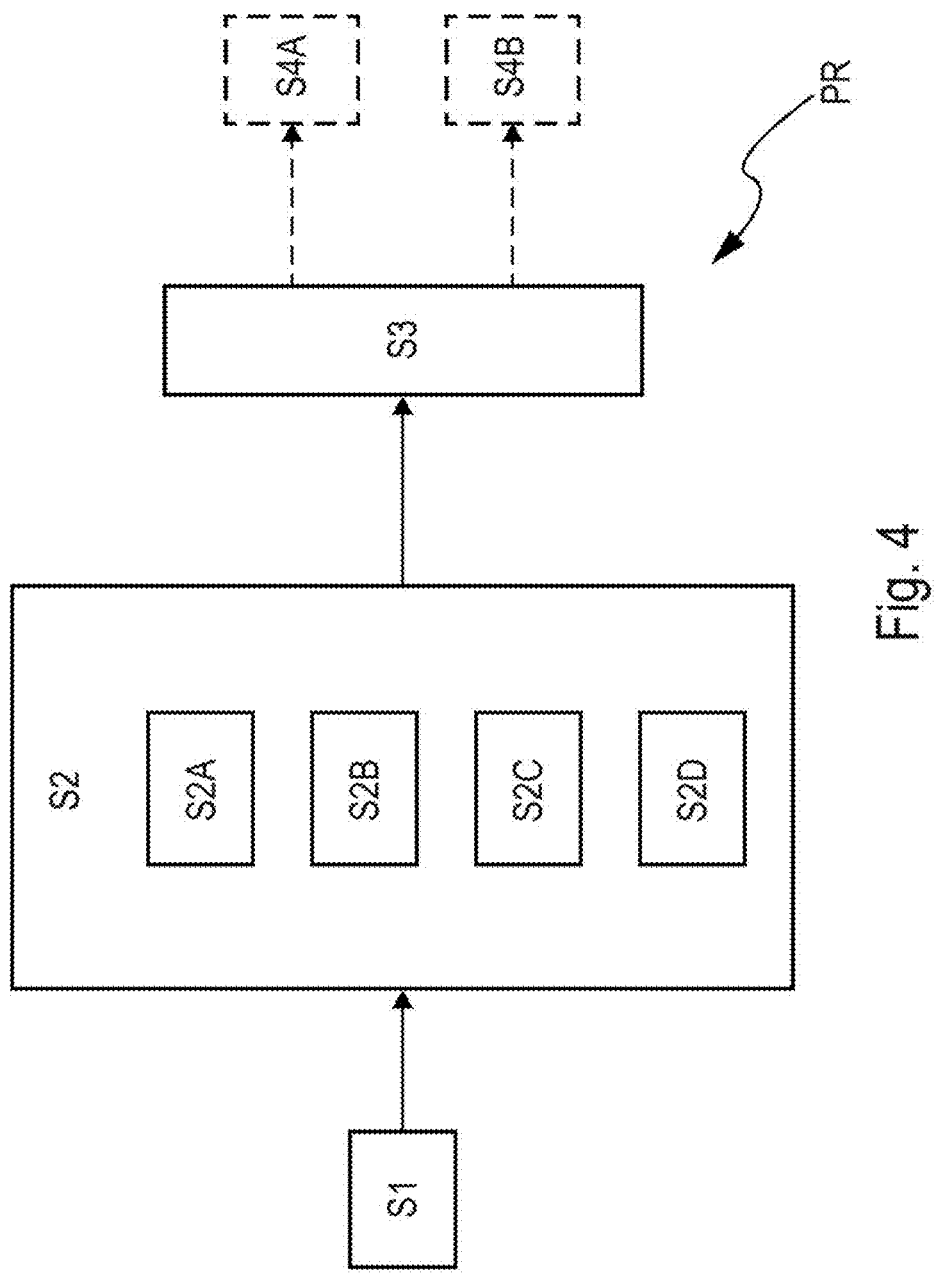
FIG. 4 schematically illustrates the main steps of a method for assisting in the management of the energy, implemented by the system of FIG. 1.

The method PR comprises, as represented in FIG. 4, at least:
  a reception step S1, implemented via the reception unit 4 (FIG. 1), comprising receiving:
  current flight data (altitude, speed, etc.) of the aircraft AC making it possible at least to determine the current energy state Ec; and current meteorological data of the environment of the aircraft AC, notably the current wind;
  a set S2 of computation steps, implemented by the data processing unit 5, comprising performing an iterative computation, backwards (or upstream) from the final position Pf, to determine (as a function of a set of predetermined rules, of a set of constraints and of current values including the current meteorological data), an optimal flight trajectory TO making it possible to generate a dissipation of the aircraft AC to bring it, at the final position Pf, into the final energy state Ef with a minimum ground distance; and an information transmission step S3, implemented by a data transmission unit 7, comprising transmitting at least the minimum distance to at least one user system 9, 10.

In the context of the present invention:

the set of rules comprises, notably, a flight envelope of the aircraft, altitude and/or speed procedure constraints, etc.; and the set of constraints comprises, for example, a prescribed approach slope, air traffic related constraints, various operational constraints, etc.

The implementation of the method PR can be activated:

either automatically, when the current energy state Ec of the aircraft changes, notably when it changes altitude and/or speed;

or at the request of a pilot or of an embedded system which would need updated information.

Furthermore, the information transmission step S3 comprises transmitting, to the user system 9, 10, also the optimal flight trajectory TO, on which are indicated positions at which actions must be implemented on the aircraft, and the actions to be implemented at these positions, which are specified hereinbelow.

The set S2 of computation steps comprises, as represented in FIG. 4, at least the following series of steps, implemented iteratively:

a first step S2A comprising determining, on each iteration, as a function at least of the set of predetermined rules, a plurality of states from a state selected on the preceding iteration. A state of the aircraft AC is defined by characteristics of the aircraft, including at least its height with respect to the ground and its speed, and possibly its distance to the destination, its weight and the weather. A state is the consequence of different values for an energy allocation factor (between potential energy and kinetic energy), the position of the landing gear, modifications of the flight configuration and air brake deflection modifications, etc., which correspond to control values. The selected state used in the first iteration corresponds to the state of the aircraft at the final position Pf;

a second step S2B comprising attributing a cost to each of the states determined in the last computation step, which makes it possible to prioritize the states as a function of this cost value. The cost depends, notably, on the corresponding ground distance. The shorter the distance, the lower the cost. The cost can also depend on other parameters; and a third step S2C comprising selecting, from among the states determined in the first step S2A, the state which exhibits the lowest cost, the state thus selected being used in the first step S2A of the next iteration. The selected states are saved.

Particular constraints can be used to restrict the search space and contribute to the generation of the states. Constraints that can be cited as examples include the flight envelope, altitude and speed procedure constraints, and any other operational constraint.

The method PR performs the processing operations iteratively among the determined set of states, to reach an initial position Pi (exhibiting the initial energy state Ei) of the aircraft AC, so as to obtain the minimum ground distance.

Furthermore, the method PR also comprises a fourth step S2D comprising determining the optimal flight trajectory TO of the aircraft AC, notably from the states selected and retained. The optimal flight trajectory TO is the flight trajectory which makes it possible to produce the energy dissipation from the initial energy state Ei to the final energy state Ef with a ground distance which is minimal.

Moreover, the method PR can also comprise:

an automatic guidance step S4A comprising guiding the aircraft AC automatically along the optimal flight trajectory TO, by implementing the required actions at the required positions; and/or a display step S4B comprising displaying, on a display screen of the cockpit of the aircraft AC, elements of the optimal flight trajectory TO, either to inform the pilot during automatic guidance, or to assist the pilot in performing manual piloting in accordance with the optimal flight trajectory (by implementing the required actions at the required positions).

Consequently, the guidance of the aircraft AC for it to reach the final position Pf with the final energy state Ef, can therefore be performed via:

manual piloting (using the display unit 10);

automatic piloting (using the automatic pilot 9), in selected mode; or automatic piloting (using the automatic pilot 9), in managed mode.

In the context of the present invention, characteristics of the optimal flight trajectory TO can be presented in different ways to the pilots of the aircraft, in particular using the display unit 10, some of which are presented hereinbelow by way of illustration.

Figure 5:
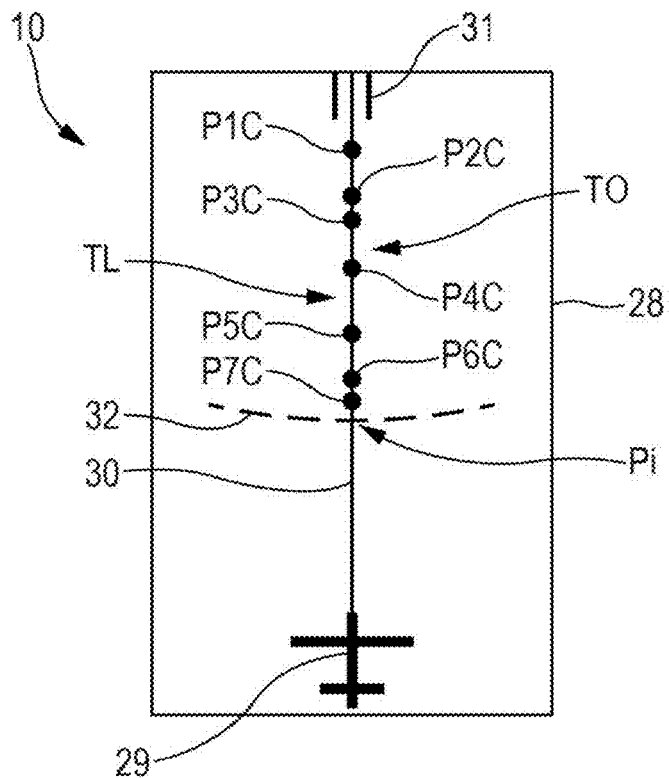
FIG. 5 schematically shows a display implemented on a horizontal display screen.

FIG. 5 shows a part of a display screen 28 of ND ("Navigation Display") type forming part of the display unit 10, on which are displayed, in the normal manner, a symbol 29 representing the current position of the aircraft, a line 30 illustrating the lateral trajectory TL of the optimal flight trajectory TO, with points P1C to P7C. This screen 28 also shows, in front of the aircraft, a symbol 31 illustrating the position of the landing runway and a circular arc 32 indicating the minimum approach distance.

The minimum approach distance (or minimum ground distance) defines, in real time and taking into account the current state of the aircraft and current conditions of the environment, the limit point Pi beyond which (in the direction of flight of the aircraft) a stabilized approach is no longer possible, that is to say beyond which it is no longer possible to dissipate the energy difference between the current energy state of the aircraft and the required final energy state.

The points P1C to P7C illustrate positions where actions (such as those specified hereinabove) must be performed on the aircraft.

Figure 6:
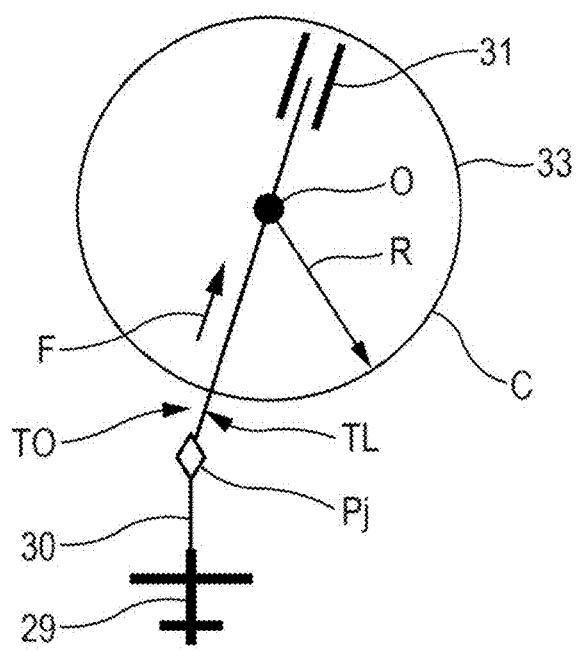
FIG. 6 schematically illustrates a first position of the aircraft with respect to an energy circle, outside of the energy circle, and FIG. 7 schematically illustrates a second position of the aircraft with respect to an energy circle, inside the energy circle.
Figure 7:
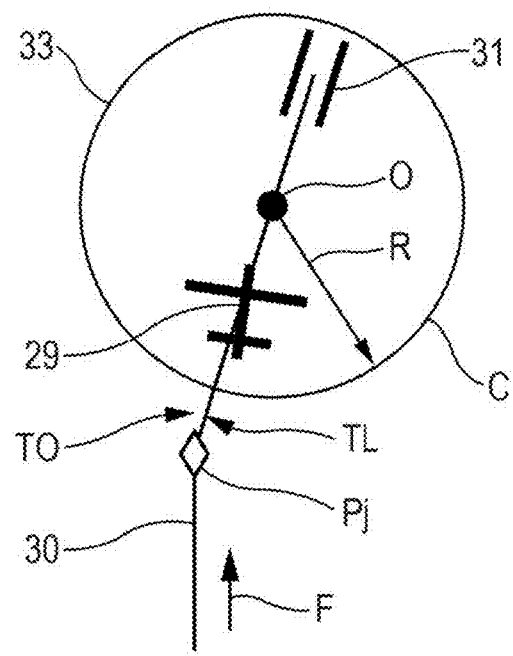

In a variant embodiment, represented in FIGS. 6 and 7, the minimum ground distance of the optimal flight trajectory TO (or limit energy trajectory) is displayed through an energy circle concept. Thus, the crew is aware of the proximity of the circle displayed on a navigation display.

As represented in FIGS. 6 and 7, it is possible to provide an energy circle 33, of center O (corresponding to the final point Pf or stabilization point) situated on the line 30 (on which there is represented a particular way point Pj) and of radius R (equal to the determined minimum ground distance). The more distant the aircraft (symbol 29) is from the energy circle 33, the more margins it has to achieve the stabilization.

In the example of FIG. 6, the display of the energy circle 33, slightly downstream of the position of the aircraft, informs the pilot of the proximity of the energy limit. When the aircraft arrives at the energy circle 33, the only trajectory which ensures a stabilized approach is the optimal flight trajectory TO (or limit energy trajectory).

When the aircraft AC is situated inside the energy circle 33, as in the example of FIG. 7, stabilization is no longer possible. Indeed, there is no trajectory which makes it possible to arrive at the stabilization point (final position Pf) with the required energy (final energy state Ef). This information can be communicated to air traffic to warn it that stabilization is no longer possible, in order for it to redefine the position of the aircraft AC in the arrival flow. Thus, the aircraft does not have to perform a go-around, and it can be reintroduced into the flow of aircraft scheduled for landing at a position other than its initial position.

In a particular embodiment (not represented), the optimal flight trajectory TO can be displayed on a vertical display system.

Furthermore, in another embodiment (not represented), the display of the vertical trajectory TV and/or of the lateral trajectory TL of the optimal flight trajectory TO (or limit energy trajectory) can be provided on an electronic tablet of EFB ("Electronic Flight Bag") type that is available to the pilots.

The system 1 and the method PR, as described above, therefore make it possible to determine, and present to the pilots, an optimal flight trajectory which makes it possible to stabilize the aircraft with a minimum ground distance, for different current meteorological data, and notably for any type of wind profile, and therefore corresponds to an effective energy limit trajectory.

The system 1 and the method PR consequently make it possible to increase, in real time, the awareness of the pilots to the energy, in order to reduce the number of non-stabilized approaches and therefore the number of go-arounds. The number of incidents or accidents resulting from a landing with excessively high energy can thus be reduced.

Indeed, the computation of the optimal flight trajectory is adjusted to take into account, in real time, the current energy state of the aircraft. Thus, if the altitude and/or the speed of the aircraft change, the computation is restarted to include the new altitude and/or the new speed in the computation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting in a management of an energy state of an aircraft, the energy state representing a total mechanical energy of the aircraft, in an approach phase with a view to a ground landing, said approach making it possible to join a final position at which the aircraft needs to have a final energy state from a current energy state of the aircraft, comprising:

at least one reception step, implemented by a reception unit, comprising receiving current flight data of the aircraft making it possible at least to determine said current energy state, and current meteorological data of the environment of the aircraft, said current energy state based on a current altitude and a current speed of the aircraft;

a set of computation steps, implemented by a data processing unit on the aircraft, comprising performing an iterative computation, backwards from said final position, to determine, as a function at least of a set of predetermined rules, of a set of constraints and of current values including said current meteorological data, an optimal flight trajectory from an initial position, independent of a current position, to the final position making it possible to generate a dissipation of the energy of the aircraft to bring the aircraft, at said final position, into said final energy state with a minimum distance in horizontal projection on the ground, said optimal flight trajectory defining positions at which actions must be implemented on the aircraft;

a data transmission step, implemented by a data transmission unit, comprising transmitting at least said minimum distance in horizontal projection on the ground to at least one user system; and, guiding the aircraft to the final position Pf with the final energy state along the optimal flight trajectory with at least one of manual piloting, automatic piloting in a selected mode, and automatic piloting in a managed mode.

2. The method according to claim 1, wherein said set of computation steps comprises at least the following series of steps, implemented iteratively:

a first step comprising determining, on each iteration, as a function at least of said set of predetermined rules, a plurality of states from a state selected on a preceding iteration, a selected state used in a first iteration corresponding to a state of the aircraft at said final position, said selected states being saved;

a second step comprising attributing a cost to each of the states determined in said first step; and a third step comprising selecting, from among the states determined in said first step, a state which exhibits a lowest cost, the state thus selected being used in a first step of a next iteration, the state selected in a last iteration being used to determine the optimal flight trajectory of the aircraft.

3. The method according to claim 2, wherein a state is defined by characteristics of the aircraft, including at least its height with respect to the ground and its speed.

4. The method according to claim 1, wherein said meteorological data comprise at least one of the following data:
a wind speed;
a temperature.

5. The method according to claim 1, wherein said data transmission step comprises transmitting, to said user system, also said optimal flight trajectory, on which are indicated positions at which actions must be implemented on the aircraft, and the actions to be implemented at these positions.

6. The method according to claim 1, further comprising a display step comprising displaying, on a display screen of a cockpit of the aircraft, at least one limit point corresponding to a point upstream on said optimal flight trajectory where said minimum distance in horizontal projection on the ground begins.

7. The method of claim 1, wherein the guiding the aircraft to the final position Pf with the final energy state along the optimal flight trajectory comprises manual piloting.

8. The method of claim 1, wherein the guiding the aircraft to the final position Pf with the final energy state along the optimal flight trajectory comprises automatic piloting in a selected mode.

9. The method of claim 1, wherein the guiding the aircraft to the final position Pf with the final energy state along the optimal flight trajectory comprises automatic piloting in a managed mode.

\* \* \* \* \*